(12) United States Patent
Xu et al.

(10) Patent No.: US 11,223,284 B2
(45) Date of Patent: Jan. 11, 2022

(54) SYSTEM AND METHOD FOR DETERMINING A PRIMARY SWITCHING EVENT IN AN ISOLATED CONVERTER

(71) Applicant: DIALOG SEMICONDUCTOR INC., Campbell, CA (US)

(72) Inventors: Kuangzhe Xu, Campbell, CA (US); Pengju Kong, Campbell, CA (US); Jiandong Zhang, Campbell, CA (US); Hien Bui, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 117 days.

(21) Appl. No.: 16/779,459

(22) Filed: Jan. 31, 2020

(65) Prior Publication Data

US 2021/0242783 A1 Aug. 5, 2021

(51) Int. Cl.
*H02M 3/335* (2006.01)

(52) U.S. Cl.
CPC ... *H02M 3/33523* (2013.01); *H02M 3/33538* (2013.01); *H02M 3/33569* (2013.01)

(58) Field of Classification Search
CPC ......... H02M 3/33523; H02M 3/33538; H02M 3/33569; H02M 3/33507; H02M 3/33576; H02M 3/33592
See application file for complete search history.

(56) References Cited

U.S. PATENT DOCUMENTS

| | | | |
|---|---|---|---|
| 10,063,159 B1 * | 8/2018 | Kong | H03K 5/1252 |
| 10,158,297 B1 * | 12/2018 | Gong | H02M 3/33592 |
| 10,461,644 B1 * | 10/2019 | Gong | H02M 3/1582 |
| 2010/0027298 A1 * | 2/2010 | Cohen | H02M 3/33592 363/21.14 |
| 2017/0250612 A1 * | 8/2017 | Malinin | H02M 7/003 |
| 2019/0348920 A1 * | 11/2019 | Wong | H02M 3/33523 |

* cited by examiner

*Primary Examiner* — Kyle J Moody
*Assistant Examiner* — Lakaisha Jackson
(74) *Attorney, Agent, or Firm* — Haynes and Boone, LLP (57) ABSTRACT

Disclosed is a system for determining a primary switching event in an isolated converter having a primary-side and a secondary-side. The system includes a primary-switch (PS) on the primary-side, a synchronous rectifier (SR) on the secondary-side, an integration circuit, and a SR controller. The integration circuit is in signal communication with the SR on the secondary-side and the SR controller is in signal communication with the SR and the integration circuit. The SR is configured to produce a drain-to-source voltage ($V_{DS}$) and the integration circuit is configured to integrate a difference between the $V_{DS}$ and a output voltage ($V_{Out}$) (produced by the secondary-side) over time to produce a $V_{DS}$ over time value ($V_{Time}$). The SR controller is configured to determine if the $V_{DS}$ is greater than a first threshold voltage ($V_{TH}$) and determine the primary switching event when the $V_{Time}$ is greater than a second threshold voltage ($VS_{TH}$).

20 Claims, 5 Drawing Sheets

SYSTEM AND METHOD FOR DETERMINING A PRIMARY SWITCHING EVENT IN AN ISOLATED CONVERTER

TECHNICAL FIELD

This application relates to synchronous rectification in a switching power converter, and more particularly to a switching power converter with adaptive sensing of a primary switching event.

BACKGROUND

Isolated converters such as, for example, flyback switching power converters are commonly used in modern power supplies and are utilized in both alternating current (AC) to direct current (DC) and DC to DC conversion with galvanic isolation between the input and any outputs of a power supply. In general, a flyback converter is a buck-boost converter having an inductor that is split to form a transformer such that the voltage ratios are multiplied with an additional advantage of isolation. A flyback converter has a primary-side and secondary-side, where the primary-side of the flyback converter includes a primary-side power switch transistor (also known as a "PS transistor") and the secondary-side includes a rectifier, such as a diode or a synchronous rectifier transistor, to rectify the current produced by the secondary-side of the flyback converter. A synchronous rectifier transistor (also known as a "SR transistor"), such as a metal-oxide-semiconductor field-effect transistor ("MOSFET") offers improved efficiency over the use of a diode. A controller device or circuit (generally known as a "SR controller") controls the operation of the SR transistor in response to the cycling of the PS transistor.

In a discontinuous current mode (DCM), the SR controller monitors a voltage (for example, the drain-to-source voltage $V_{DS}$) of the SR transistor to determine when the power switch transistor has cycled off so that the SR controller may cycle on the SR transistor. The source of the SR transistor is typically ground such that the drain-to-source voltage $V_{DS}$ is also the drain voltage for the SR transistor. Generally, the SR controller monitors the $V_{DS}$ voltage and then switches on the SR transistor when the $V_{DS}$ voltage drops to a negative threshold voltage. However, the $V_{DS}$ voltage is subject to resonant ringing after the SR transistor has been cycled off. This resulting noise on the $V_{DS}$ voltage can cause the SR controller to switch on the SR transistor while the PS transistor is still on (generally known as "mis-triggering"), resulting in reduced efficiency, large output currents, and possible system damage.

There is thus a need in the art to determine an improved SR transistor timing that increases efficiency and minimizes mis-triggering.

SUMMARY

Disclosed is a system for determining a primary switching event in an isolated converter having a primary-side and a secondary-side. The system includes a power switch (PS) transistor on the primary-side, a synchronous rectifier (SR) transistor on the secondary-side, an integration circuit, and a synchronous rectifier controller (SR controller). The integration circuit is configured to integrate a difference between the $V_{DS}$ voltage (for the SR transistor) and an output voltage over an integration period to produce a $V_{DS}$ voltage over time value denoted herein as volt-second value ($V_{Time}$). The integration period begins when the $V_{DS}$ voltage exceeds a first threshold voltage and ends when the $V_{DS}$ voltage falls below the first threshold voltage. There may thus be an integration period during an on-time of the power switch transistor and another during a peak of a resonant oscillation in the $V_{DS}$ voltage following a switching-off of the SR transistor. In general, there are a series of such oscillations following the switching-off of the SR transistor and prior to the subsequent switching-on of the PS transistor. Each time an oscillation of the $V_{DS}$ voltage exceeds the first threshold voltage defines a corresponding integration period. There will thus be a series of integration periods for a series of oscillations of the $V_{DS}$ voltage that exceed the first threshold voltage.

To obtain a volt-second value, the integration circuit may integrate a difference between the $V_{DS}$ voltage and an output voltage for each oscillation period. The SR controller is configured to detect the primary switching event when the volt-second value is greater than a second threshold voltage ($VS_{TH}$). The second threshold voltage is adapted to equal a high-level voltage ($VS_{High}$) when a previous primary switching event has been detected and to equal an adaptive voltage ($VS_{Adap}$) when the SR transistor is set to an OFF-state.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

A system is provided for determining a primary switching event in which a power-switch (PS) transistor is cycled on in an isolated converter such as a flyback converter. A transformer in the system has a primary winding for a primary-side and a secondary winding for a secondary-side.

The system includes a synchronous rectifier (SR) transistor on the secondary-side, an integration circuit, and a synchronous rectifier controller (SR controller). The integration circuit is configured to integrate a difference between the $V_{DS}$ voltage and an output voltage for the flyback converter over an integration period to produce a volt-second value. The integration period begins when the $V_{DS}$ voltage rises above a first threshold voltage and ends when the $V_{DS}$ voltage falls below the first threshold voltage. The SR controller detects the primary switching event when the volt-second (volt-sec) value is greater than an adaptive second threshold voltage ($VS_{TH}$). The adaptive second threshold is adapted to equal a high-level voltage ($VS_{High}$) when a previous primary switching event has been detected. In addition, the adaptive second threshold is adapted responsive to the volt-second value when the SR transistor is set to an OFF-state.

In an example of operation, the system performs a method of integrating a difference between the $V_{DS}$ voltage and the output voltage over the integration period to produce the volt-second value and then detecting a current primary switching event responsive to the volt-second value being greater than the second threshold voltage.

In general, the system and method utilize the adaptive second threshold voltage to detect the current primary switching event so that the SR transistor may then be cycled on. This avoids SR transistor mis-triggering during oscillations of the $V_{DS}$ voltage by only allowing the SR transistor turn-on once after the current primary switching event detection. Mis-triggering of the SR transistor may reduce the efficiency and possibly cause damage to the isolated converter or other devices in signal communication with the isolated converter.

Although an adaptive threshold on the volt-second values from the $V_{DS}$ voltage to detect a primary switching event may be used for the control of the SR transistor switching, those of ordinary skill will appreciate that this primary switching event detection is not limited to SR control but may also be utilized for other control purposes such as, for example, fault detection and/or protection in the SR controller.

Figure 1:
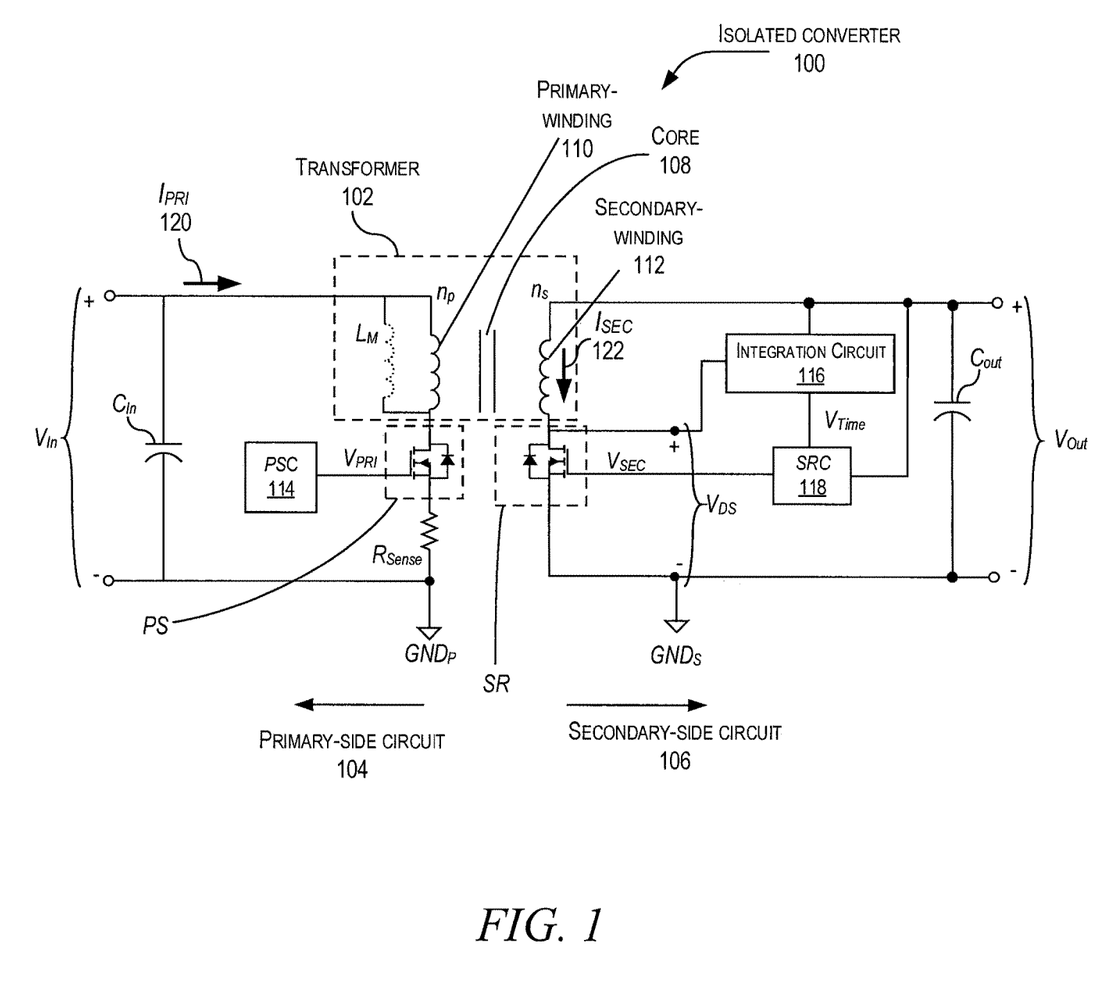
FIG. 1 is a schematic system diagram of an example of an implementation of an isolated converter in accordance with the present disclosure.

In FIG. 1, a schematic system diagram of an example implementation of an isolated converter such as a flyback converter 100 is shown in accordance with the present disclosure. The flyback converter 100 includes a transformer 102 that divides the flyback converter 100 into a primary-side circuit 104 and secondary-side circuit 106. The transformer 102 also includes a transformer core 108 and a primary-winding 110 and a secondary-winding 112, where the primary-winding 110 is coupled to the primary-side circuit 104 and the secondary-winding 112 is coupled to the secondary-side circuit 106. In this example, the transformer 102 is modeled as including the transformer core 108, the primary-winding 110, secondary-winding 112, and a magnetizing inductance ($L_M$).

The primary-side circuit 104 includes a PS transistor, a primary-side controller (PSC) 114, and a sensing resistor ($R_{sense}$) between the source of a transistor of the PS transistor and a primary-side ground ($GND_P$). The secondary-side circuit 106 includes a secondary-side SR transistor, an output capacitor ($C_{out}$), an integration circuit 116, and an SR controller 118. Integration circuit 116 is shown separately from SR controller 118 for illustration clarity but it will be appreciated that integration circuit 116 may be a part of SR controller 118 or be distinct from SR controller 118. SR controller 118 may be implemented using an integrated circuit such as an application-specific-integrated-circuit (ASIC). In this example, the primary-winding 110 is an electrical coil that has $n_p$ number of turns that is wrapped around a part of the core 108 on the primary-side circuit 104. Similarly, the secondary-winding 112 is an electrical coil that has $n_s$ number of turns that is wrapped around another part of the core 108 on the secondary-side circuit 106.

In flyback converter 100, the PS transistor and the SR transistor are n-channel enhancement metal-oxide semiconductor field-effect (MOSFET) transistors but it will be appreciated that other types of transistors such as bipolar junction transistors or PMOS transistors may be used in alternative embodiments. The drain of the PS transistor is coupled to the primary-winding 110, the source of the PS transistor is coupled to the ground $GND_P$, and a gate of the PS transistor is coupled to the primary-side controller 114. Furthermore, in this example, a drain of the SR transistor is coupled to the secondary-winding 112, the source of the SR transistor is coupled to a secondary-side ground ($GND_S$), and a gate of the SR transistor is coupled to the SR controller 118. Moreover, the integration circuit 116 is coupled to the drain of the SR transistor and to the secondary-winding 112. The SR controller 118 is also coupled to the secondary-winding 112.

In an example of operation, the flyback converter 100 receives the input voltage $V_{In}$ and produces the output voltage $V_{Out}$. The primary-side circuit 104 receives the input voltage as supported by an input capacitor $C_{In}$. Initially, when the PS transistor is off (i.e., in an OFF-state), the primary-side current $I_{PRI}$ 120 does not conduct such that the drain voltage of the PS transistor equals the input voltage. When the primary-side controller 114 produces a gate bias voltage (i.e., primary-side gate bias voltage "$V_{PRI}$") on the gate of the PS transistor, the PS transistor turns-on (i.e., changes to an ON-state) and the primary-side current $I_{PRI}$ 120 begins increasing from zero to flow through primary-winding 110, the PS transistor, and the sense resistor $R_{Sense}$ into the ground $GND_P$. As the primary-side current $I_{PRI}$ 120 conducts through the primary-winding 110, magnetic energy is stored in the transformer 102.

While the primary-side current $I_{PRI}$ 120 conducts, the SR transistor is initially off (i.e., set initially to an OFF-state) so that no energy flows from the transformer 102 to the secondary-side circuit 106. While the SR transistor stays off, any power produced by the secondary-side circuit 106 is from the charge stored in the output capacitor $C_{Out}$ to support the output voltage. Once the primary-side controller 114 discharges the gate voltage $V_{PRI}$ for the PS transistor, the PS transistor turns off (i.e., is set to an OFF-state). Note that the PS transistor is repeatedly cycled on and off to regulate the output voltage. With regard to a current cycle of the PS transistor there will thus typically be a previous cycle. Once a primary switching event is detected, that detection becomes a previous primary switching event. The subsequent primary switching event is then the current switching event, and so on. After detecting a previous primary switching event, the SR controller 118 turns on the SR transistor (i.e., is set to an ON-state) so that the stored magnetic energy in the transformer 102 powers the secondary-winding current $I_{SEC}$ 122 to boost the output voltage and re-charge the output capacitor $C_{Out}$. The SR controller 118 turns on the SR transistor by charging a gate bias voltage (i.e., secondary-side gate bias voltage "$V_{SEC}$") for the SR transistor.

The $V_{DS}$ voltage across the SR transistor is 0 V while the SR transistor conducts. But after the SR transistor is switched off, the $V_{DS}$ voltage will resonantly oscillate. As noted earlier, these resonant oscillations can falsely trigger conventional SR controllers to again switch on the SR transistor. To protect against this problem, the integration circuit 116 integrates a difference between the $V_{DS}$ voltage and the output voltage over an integration period to produce the volt-second value. The resulting volt-second value following a previous primary switching event detection is then used to adapt the second threshold voltage.

The integration circuit 116 may be implemented as a current source, a capacitor, and two or more switches. For example, the integration circuit 116 is configured to calculate the volt-second value according to the following relationship $$V_{Time} = \int (V_{DS} - kV_{Out}) dt$$

where the value for k may be equal to 1 or any other integer. This volt-second value is calculated while the $V_{DS}$ voltage is greater than the first threshold voltage $V_{TH}$. For example, the first threshold voltage may be proportional to the output voltage.

Figure 2A:
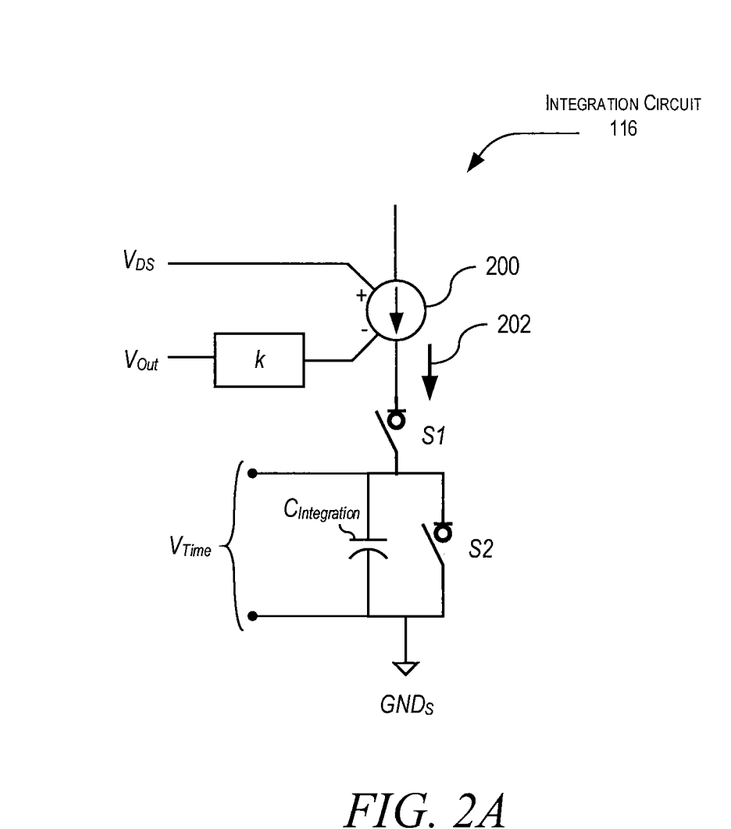
FIG. 2A is a schematic system diagram of an example of an implementation of an integration circuit, shown in FIG. 1, in accordance with the present disclosure.

Turning to FIG. 2A, a schematic system diagram of an example integration circuit 116 is shown in accordance with the present disclosure. The integration circuit 116 includes a current source 200, an integration capacitor ($C_{integration}$), and two switches S1 and S2. In this example, the current source 200 is configured to receive the $V_{DS}$ voltage and the output voltage and convert the voltage difference between these voltages into a current 202. The current 202 charges the integration capacitor $C_{integration}$ while the first switch S1 is closed to form the volt-second $V_{Time}$ as a voltage stored across the integration capacitor $C_{integration}$. After the volt-second is determined, the first switch is opened and second switch S2 closed to discharge the integration capacitor $C_{integration}$.

Figure 2B:
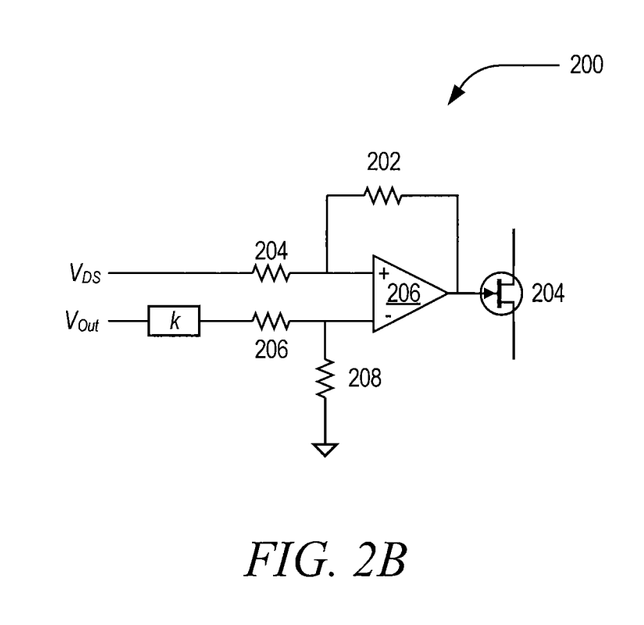
FIG. 2B is a schematic system diagram of an example of an implementation of a current source, shown in FIG. 2B, in accordance with the present disclosure.

In FIG. 2B, a schematic system diagram of an example current source 200 is shown in accordance with the present disclosure. In this example, the current source 200 may include a field-effect transistor (FET) 204 such as a MOSFET, and a difference amplifier that includes a differential amplifier (op-amp) 206 and a resistor network having resistors R1, R2, R3, and R4.

Referring again to FIG. 1, the SR controller 118 is configured to determine the primary switching event (switch-on event) when the volt-second value is greater than the second threshold voltage. Once the primary switching event is detected, the SR controller 118 increases the second threshold voltage $VS_{TH}$ to equal a high voltage ($VS_{High}$). The SR controller 118 then cycles on the SR transistor in response to the $V_{DS}$ voltage dropping to zero or becoming slightly negative. After an SR transistor on-time period, the SR controller 118 switches off the SR transistor, whereupon the $V_{DS}$ voltage begins resonantly oscillating to cross the first threshold voltage. The integration circuit 116 then calculates the volt-second value for each resonant oscillation in which the $V_{DS}$ voltage exceeds the first threshold voltage. The SR controller 118 then uses the resulting volt-second value so that the second threshold voltage may be adapted responsive to the volt-second values. Due to this adaptation, the second threshold voltage may also be denoted as an adaptive voltage ($VS_{Adap}$).

The adaptive voltage initially equals the high voltage $VS_{High}$ following a previous primary switching event detection. For every peak in the resonant oscillation of the $V_{DS}$ voltage that exceeds the first threshold voltage, there is a corresponding volt-second value. For each such peak, the SR controller 118 adapts the adaptive voltage to equal the corresponding volt-second value. To account for measurement noise, the adaptive voltage may be adjusted to the corresponding volt-second value plus an offset value (for example, a predetermined offset value). In general, the $V_{DS}$ voltage includes a plurality of oscillations when the SR transistor is turned off (set to the OFF-state) and each of these oscillations includes a peak voltage level and a valley voltage level. These oscillations are usually referred to as "ringing" and start with large magnitude values between the peak voltage level to the valley voltage level and then gradually dampen as time passes. As such, the volt-second values for the oscillations that exceed the first threshold voltage will gradually decrease as the oscillations dampen.

The adaptive voltage will thus decrease as it is adapted to progressively smaller and smaller oscillations of the $V_{DS}$ voltage. But there is a minimum value $VS_{Low}$ for the adaptive voltage $VS_{Adap}$ such that the adaptive voltage cannot be adapted below this minimum or clamped value. This minimum value $VS_{Low}$ may or may not be reached by the adaptive voltage depending upon how the resonant oscillations dampen. But once it is reached, the adaptive voltage is clamped at the minimum value $VS_{Low}$. In general, the predetermined offsets that may be added to the volt-second values to adapt the adaptive voltage are offsets that are chosen to minimize the effects of noise that can cause mis-triggering.

Figure 3A:
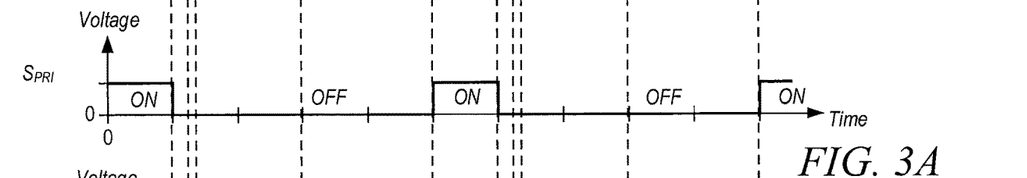
FIG. 3A-3E are signal waveforms produced by the isolated converter in an example of operation in accordance with the present disclosure.
Figure 3B:
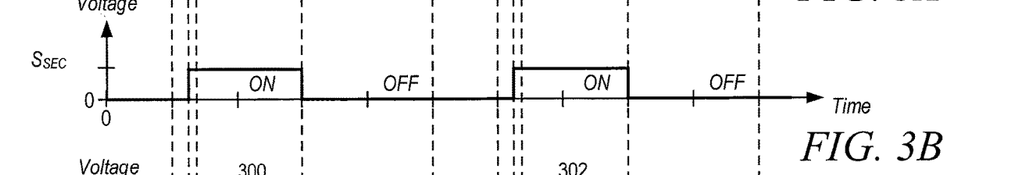
Figure 3C:
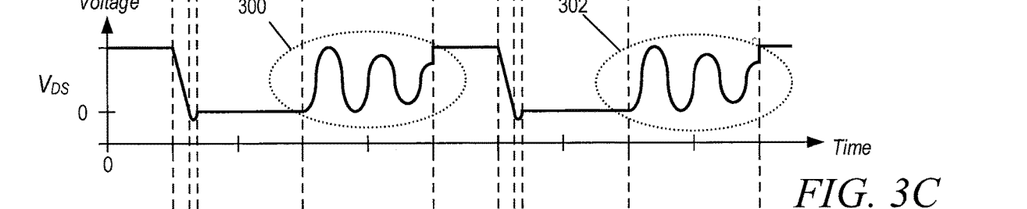
Figure 3D:
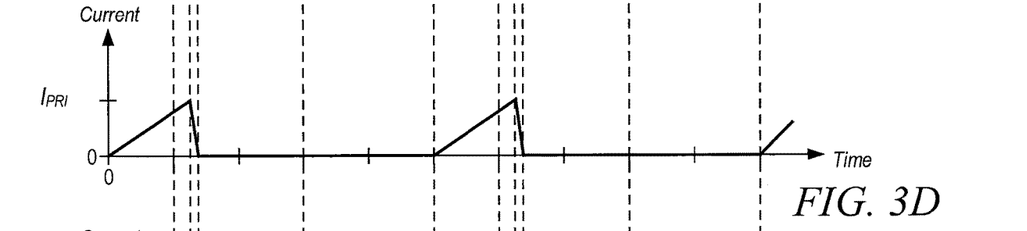
Figure 3E:
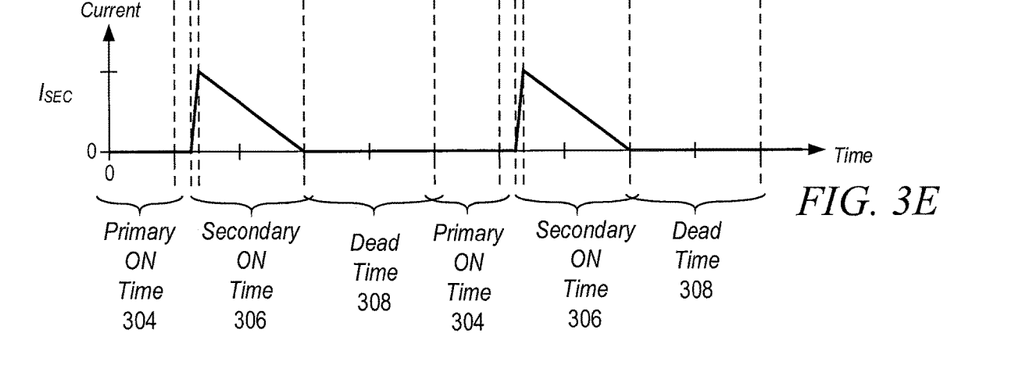

In FIG. 3A-3E, signal waveforms produced by the flyback converter 100 are shown in accordance with the present disclosure. In this example, FIG. 3A is a plot of the PS transistor on-time as defined by its gate voltage ($S_{PRI}$) over several switching cycles. FIG. 3B is a plot of the SR transistor on-time as defined by its gate voltage ($S_{SEC}$) for these switching cycles. FIG. 3C is a plot of the $V_{DS}$ voltage for the switching cycles. FIG. 3D is a plot of the primary-winding current $I_{PRI}$ for the switching cycles. FIG. 3E is a plot of the secondary-winding current $I_{SEC}$ for the switching cycles. As shown in FIG. 3C, the oscillations (i.e., ringing) 300 and 302 on the $V_{DS}$ voltage are shown to start when the SR transistor is turned-off (i.e., $S_{SEC}$ is OFF at approximately 0 volts). During an initial primary-side ON time 304 (i.e., the PS transistor is in the ON-state) corresponding to when the $S_{PRI}$ is high (i.e., ON), the $S_{SEC}$ is low (i.e., OFF), the $V_{DS}$ voltage is high, the primary-winding current $I_{PRI}$ is ramping up from 0 amps to a high value, and the secondary-winding current $I_{SEC}$ is at 0 amps. Following the initial primary-side ON time 304 is an SR transistor on-time (secondary on-time) 306 in which the PS transistor is in the OFF-state and the SR transistor is in the ON-state. During secondary on-time 306, $S_{PRI}$ is low (i.e., OFF) and the $S_{SEC}$ is high (i.e., ON). The $V_{DS}$ voltage equals 0 volts, the primary-winding current $I_{PRI}$ is at 0 amps, and the secondary-winding current $I_{SEC}$ is quickly high and then ramping down to 0 amps. A dead time 308 corresponds to when the $V_{DS}$ voltage is oscillating (ringing). More generally, dead time 308 begins at the SR transistor off-time and extends to the on-time for the current cycle of the PS transistor.

From these figures it is appreciated that during a primary turn-on (i.e., primary-side ON time 304), the $V_{DS}$ voltage rises high. However, the $V_{DS}$ voltage also rises high during the oscillation ringing in the dead time 308 when both the PS transistor and the SR transistor are in an OFF-state. As such, a voltage threshold detection alone is not enough to differentiate primary turn-on and ringing. Integrating the $V_{DS}$ voltage over an integration period to adapt the adaptive voltage provides better differentiation between when the $V_{DS}$ voltage is high from a primary switch-off event versus from a peak of the ringing 300 or 302.

In general, if the volt-second value resulting from the primary-side ON time 304 is much higher than volt-second of the peaks of the ringing 300 or 302 oscillations, the primary-side ON time 304 can be determined based on whether the volt-second voltage is higher than a certain threshold level. Unfortunately, generally such a fixed threshold level leads to unsatisfactory performance, particularly in operating modes in which the primary-side ON time 304 is relatively short. When the primary-side ON time 304 is relatively short in response to a light load, the volt-second $V_{Time}$ of the primary-side ON time 304 and of the ringing 300 or 302 may be so close that primary switch-off event and the resonant ringing cannot be differentiated.

Figure 4:
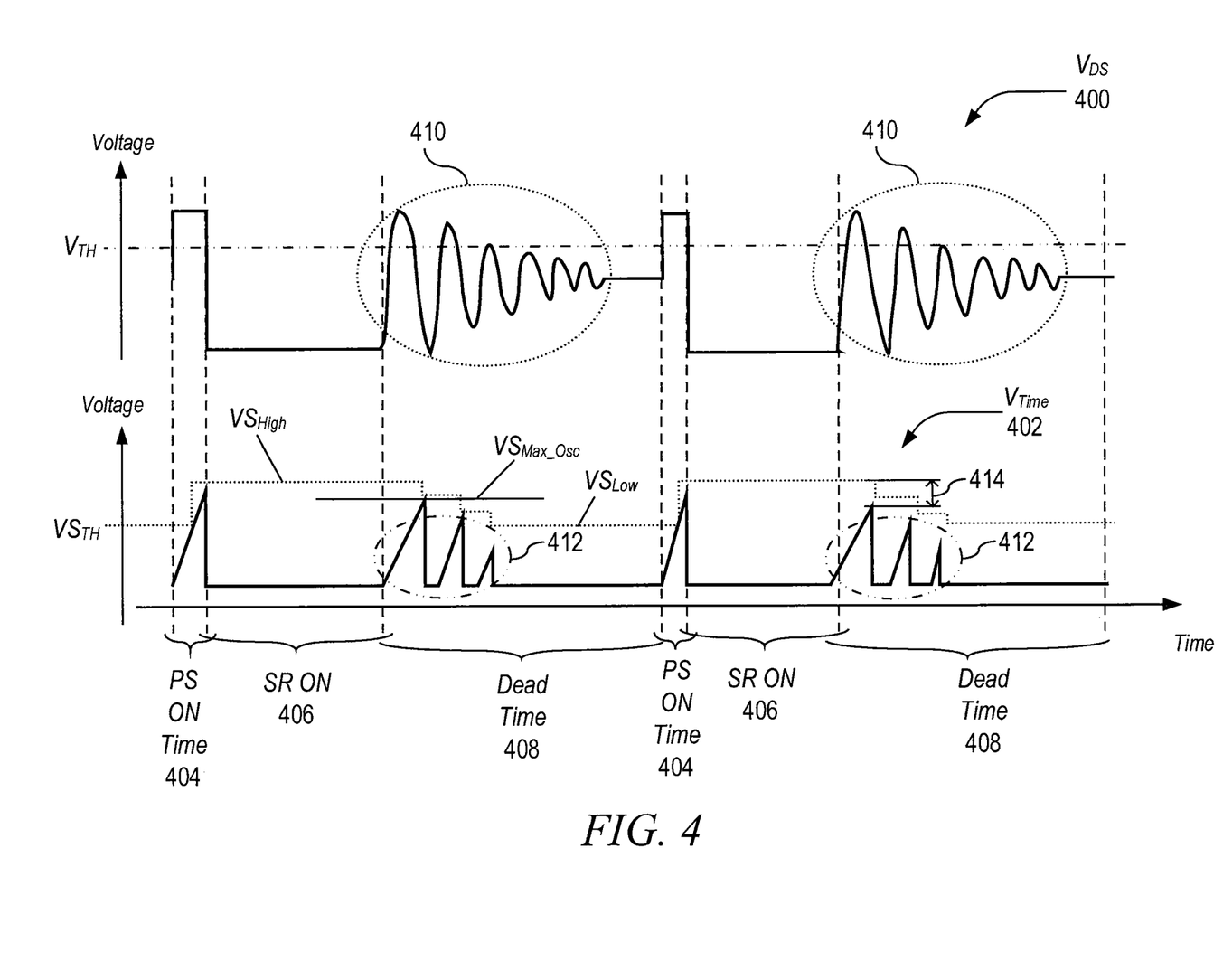
FIG. 4 is a plot of waveforms of the drain-to-source voltage and $V_{DS}$ over time value shown against a first threshold voltage and a second threshold voltage implemented by the method described in the present disclosure.

Turning to FIG. 4, a plot of waveforms of the $V_{DS}$ voltage and volt-second $V_{Time}$ are shown against a first threshold voltage (i.e., $V_{TH}$) and a second threshold voltage (i.e., $VS_{TH}$) implemented by the method described in the present disclosure. The method utilizes the $V_{TH}$ and the $VS_{TH}$ to address the issue with the wide input/output voltage applications by adaptively changing the detection threshold of the $VS_{TH}$ to overcome these limitations.

In FIG. 4, a first plot 400 of the $V_{DS}$ voltage and a second plot 402 of the volt-second value are shown. Similar to the plots shown in relation to FIGS. 3A-3E, FIG. 4 illustrates the states of operation of the flyback converter 100 as either in: a PS transistor ON time 404 (i.e., the PS transistor is in the ON-state) corresponding to when the $V_{DS}$ voltage is high; an SR transistor ON time 406 corresponding to when the $V_{DS}$ voltage substantially equals 0 V; and a dead time 408 between a switching off of the SR transistor and a detection of the current primary switching event. The $V_{DS}$ voltage is ringing 410 during the dead time 408. In a subsequent primary switching event, what was the current primary switching event becomes the previous primary switching event.

In general, the SR controller 118 continuously monitors the volt-second value when the $V_{DS}$ voltage is higher than the first threshold voltage to compare the volt-second value to the adaptively changing second threshold voltage. The second threshold voltage is used to determine if the PS transistor has cycled ON (a primary switching event). If the volt-second value for a resonant oscillation of the $V_{DS}$ voltage is higher than the second threshold voltage, a primary switching event is detected by the SR controller 118. Following this detection, the second threshold voltage adaptively changes when ringing 410 occurs in the dead time 408. As noted earlier, the second threshold voltage may also be denoted as an adaptive voltage ($VS_{Adap}$) due to this volt-second-based adaptation. The adaptive voltage may be set to the level of the volt-second value of each ringing 412 with a certain offset 414. The certain offset 414 may be a predetermined offset value that is selected to offset the adaptive voltage to be resistant to noise in the detection of the primary switching event. The adaptation of the second threshold voltage may thus be deemed to comprise forming the second threshold voltage using a function of the volt-second value.

As the resonant oscillations dampen, the corresponding volt-second values dampen as well. The adaptive voltage $VS_{Adap}$ thus reduces with this damping. Despite this damping, the second threshold voltage may be clamped at the minimum or clamped level $VS_{Low}$ to increase the accuracy of the primary switching event detection. Following the previous primary switching event detection, the SR controller increases the second threshold voltage to equal the high voltage ($VS_{High}$). For example, the high voltage may be greater than the maximum volt-second value ($V_{Time}$) of all the ringing 412 ($VS_{Max\_Osc}$). The SR controller then adaptively reduces the second threshold voltage during the dead time 408 such that the second threshold voltage remains greater than each successive volt-second value for the subsequent oscillations in ringing 412. This adaptive threshold ensures that the ringing 412 cannot trigger the primary turn-on detection and allows enough margin to detect the primary turn-on at various dead time 408 conditions.

The certain offset 414 may vary from oscillation peak to peak in the volt-second $V_{Time}$ for ringing 412. As an example, the SR controller 118 may determine a first volt-second value for an initial oscillation voltage of the $V_{DS}$ voltage that exceeds the first threshold voltage following the primary switch event detection. The adaptive voltage may then be set equal to the first volt-second value plus the value 414. Repeating the same procedure for a second oscillation of the $V_{DS}$ voltage that produces a second volt-second value, the SR controller 118 may set the adaptive voltage to equal the second volt-second value plus the predetermined offset value 414. This adaption may continue as the oscillations dampen until the adaptive voltage is clamped at the clamped level $VS_{Low}$.

Figure 5:
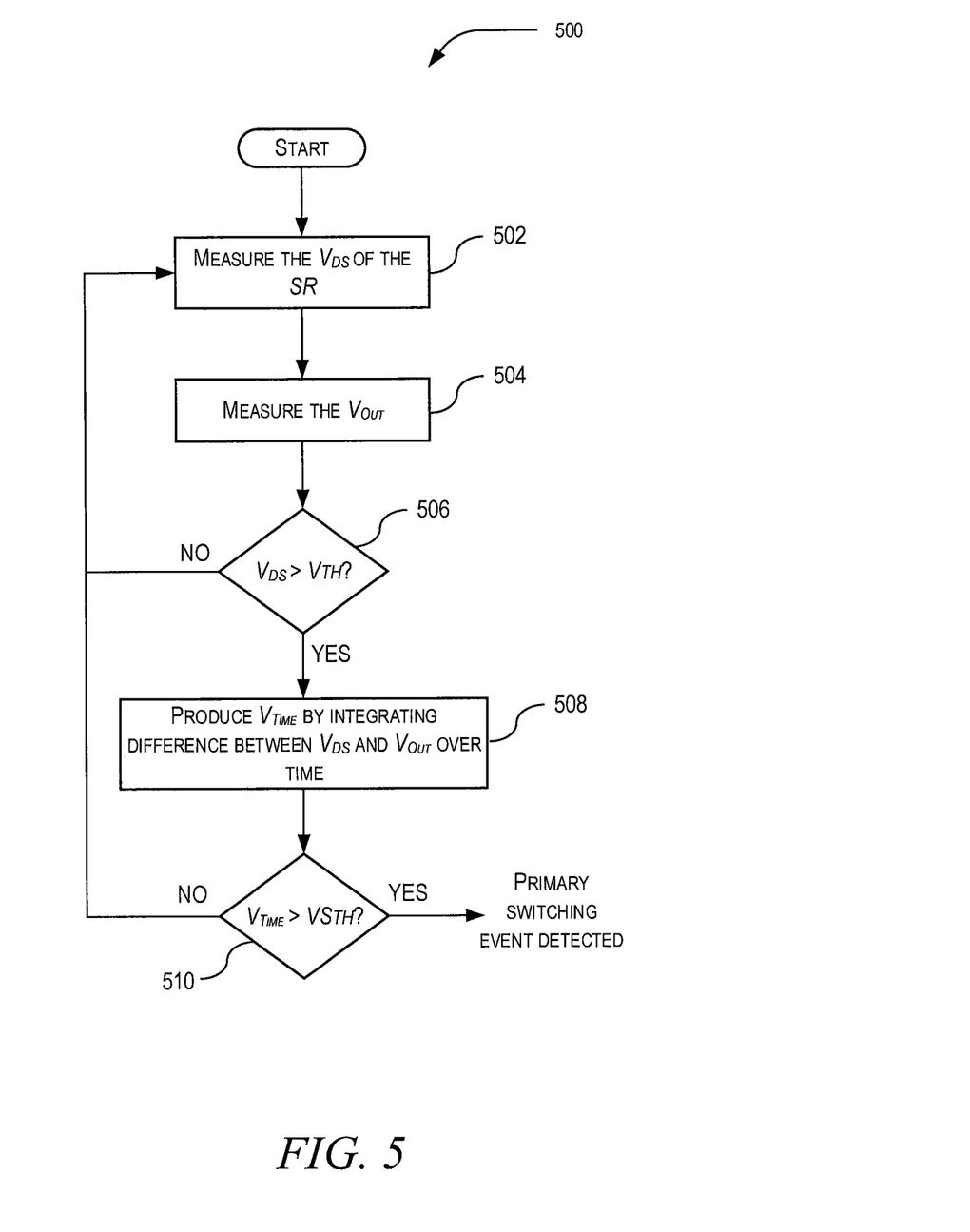
FIG. 5 is a flowchart illustrating an example of an implantation of a method in accordance with the present disclosure.

FIG. 5 is a flowchart illustrating an example method 500 of detecting a primary switching event in accordance with the present disclosure. The method 500 is utilized for determining a primary switching event in the isolated converter 100. The method 500 comprises utilizing the SR controller 118 to sense 502 the $V_{DS}$ voltage of a synchronous rectifier SR transistor and sense 504 the output voltage. The SR controller 118 then determines 506 if the $V_{DS}$ voltage is greater than the first threshold voltage $V_{TH}$. If the $V_{DS}$ voltage is not greater than the first threshold voltage $V_{TH}$, the method 500 returns to step 502 and repeats.

If, instead, the $V_{DS}$ voltage is greater than the first threshold voltage $V_{TH}$, the integration circuit 116 integrates 508 a difference between the $V_{DS}$ voltage and the output voltage $V_{Out}$ over time to produce the volt-second value $V_{Time}$. The SR controller 118 then detects 510 the primary switching event when the volt-second value $V_{Time}$ is greater than the second threshold voltage $VS_{TH}$. If the volt-second value $V_{Time}$ is not greater than the second threshold voltage $VS_{TH}$, the method returns to step 502 and the repeats.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Moreover, the operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable medium that, when executed by one or more processing units, enable the one or more processing units to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

We claim:

1. A method for determining a current primary switching event for a primary-side switch transistor in a flyback converter, the method comprising:
    integrating a difference between a drain-to-source voltage of a synchronous rectifier switch transistor and an output voltage over time to produce a volt-second value while the drain-to-source voltage is greater than a first threshold voltage;
    adapting an adaptive voltage responsive to the volt-second value;
    adapting a second threshold voltage to equal a high-level voltage in response to a detection of a previous primary switching event and to equal the adaptive voltage following a switching-off of the synchronous rectifier switch transistor; and
    detecting the current primary switching event responsive to the volt-second value being greater than the second threshold voltage.

2. The method of claim 1, wherein the high-level voltage is proportional to the output voltage.

3. The method of claim 1, wherein the difference between the drain-to-source voltage and the output voltage is a difference between the drain-to-source voltage and a scaling factor (k) times the output voltage.

4. The method of claim 1, wherein the volt-second value following the switching off of the synchronous rectifier switch transistor equals a series of volt-second values corresponding to a series of resonant oscillations for the drain-to-source voltage, and wherein adapting the adaptive voltage comprises:
    for an initial first resonant oscillation of the drain-to-source voltage, setting the adaptive voltage to equal a first volt-second value for the initial resonant oscillation plus a predetermined offset value; and
    for a second resonant oscillation following the initial resonant oscillation, setting the adaptive voltage to equal a second volt-second value for the second resonant oscillation plus the predetermined offset value.

5. The method of claim 4, further comprising switching on the synchronous rectifier switch transistor responsive to the drain-to-source voltage discharging following the detection of the previous primary switching event.

6. The method of claim 5, wherein the high-level voltage is greater than the first volt-second value.

7. The method of claim 5, wherein the high-level voltage is proportional to the output voltage.

8. The method of claim 4, wherein the second volt-second value is less than the first volt-second value.

9. The method of claim 8, wherein the adapting the adaptive voltage further includes clamping the adaptive voltage to a minimum value.

10. The method of claim 9, wherein the clamping of the adaptive voltage occurs after the setting of the adaptive voltage to equal the second volt-second value.

11. The method of claim 9, wherein integrating the difference comprising charging a capacitor with a current that is proportional to the difference.

12. A system for a flyback converter, comprising:
    an integration circuit configured to integrate a difference between a drain-to-source voltage for a synchronous rectifier switch transistor and an output voltage over time to produce a volt-second value when the drain-to-source voltage is greater than a first threshold voltage; and
    an SR controller configured to detect a current primary switching event for a primary-side power switch when the volt-second value is greater than a second threshold voltage, wherein the SR controller is further configured to adapt the second threshold voltage to equal a high-level voltage responsive to a detection of a previous primary switching event for the primary-side power switch and to equal a function of the volt-second value following a switching-off of the synchronous rectifier switch transistor.

13. The system of claim 12, wherein the first threshold voltage is proportional to the output voltage.

14. The system of claim 12, wherein the difference between the drain-to-source voltage and the output voltage is a difference between the drain-to-source voltage and a scaling factor (k) times the output voltage.

15. The system of claim 12, wherein the volt-second value following the switching off of the synchronous rectifier switch transistor equals a series of volt-second values corresponding to a series of resonant oscillations for the drain-to-source voltage, and wherein the function of the volt-second value equals a first volt-second value for a first one of the resonant oscillations plus a predetermined offset value and equals a second volt-second value for the second one of the resonant oscillations plus the predetermined offset value.

16. The system of claim 15, wherein the SR controller is further configured to switch off the synchronous rectifier switch transistor responsive to a discharge of the drain-to-source voltage following the detection of the previous primary switching event.

17. The system of claim 15, wherein the second volt-second value is less than the first volt-second value.

18. The system of claim 17, wherein the SR controller is further configured to clamp the second threshold voltage to a minimum value.

19. The system of claim 18, wherein the SR controller is further configured to clamp the second threshold voltage after the second one of the resonant oscillations.

20. The system of claim 12, wherein the SR controller includes the integration circuit.

* * * * *